(12) United States Patent
Jagow et al.

(10) Patent No.: US 7,681,656 B2
(45) Date of Patent: Mar. 23, 2010

(54) SINGLE DISC FURROW OPENER WITH WALKING BEAM

(75) Inventors: Scot Jagow, Saskatoon (CA); David Corriveau, Saskatoon (CA); Colin Rohel, Saskatoon (CA)

(73) Assignee: Bourgault Industries Ltd. (CA)

( * ) Notice: Subject to any disclaimer, the term of this patent is extended or adjusted under 35 U.S.C. 154(b) by 0 days.

(21) Appl. No.: 12/339,275

(22) Filed: Dec. 19, 2008

(65) Prior Publication Data

US 2009/0158981 A1 Jun. 25, 2009

(30) Foreign Application Priority Data

Dec. 19, 2007 (CA) .................................... 2615310

(51) Int. Cl.
*A01B 5/00* (2006.01)
*A01B 7/00* (2006.01)
*A01B 15/16* (2006.01)
*A01B 21/00* (2006.01)
*A01B 23/06* (2006.01)

(52) U.S. Cl. .................. 172/538; 111/136; 111/168

(58) Field of Classification Search ................ 172/518, 172/538; 111/134–137, 59, 62, 190–196, 111/149, 157, 163–168
See application file for complete search history.

(56) References Cited

U.S. PATENT DOCUMENTS

| 4,331,205 | A | 5/1982 | Sorenson |
| 4,750,441 | A | 6/1988 | Pfenninger |
| 4,760,806 | A | 8/1988 | Bigbee |
| 4,846,084 | A | 7/1989 | Sigle |
| 5,351,635 | A | 10/1994 | Hulicsko |
| 5,396,851 | A | 3/1995 | Beaujot |
| 5,461,993 | A | 10/1995 | Ikumoto |
| 5,609,114 | A | 3/1997 | Barton |
| 7,159,523 | B2 | 1/2007 | Bourgault |
| 7,191,715 | B2 | 3/2007 | Wendte |
| 2005/0155536 | A1* | 7/2005 | Wendte et al. .............. 111/200 |

* cited by examiner

*Primary Examiner*—Christopher J. Novosad
(74) *Attorney, Agent, or Firm*—Frost Brown Todd LLC

(57) ABSTRACT

A furrow opener apparatus has an arm assembly adapted at a front end thereof for pivotal attachment to a seeder frame. A single disc is rotatably attached to the arm assembly about a disc axis at an angle to the travel. A walking beam is pivotally attached to the arm assembly rearward of the disc about a beam axis transverse to the travel direction. A bias element exerts a force on the arm assembly such that a downward bias force is exerted on the walking beam at the beam axis. A packer wheel is rotatably attached at a rear end of the walking beam, and a gauge wheel is rotatably attached at a front end of the walking beam. The gauge wheel is configured to roll along the ground adjacent to the leading face of the disc, and the packer wheel is configured to roll along the furrow.

15 Claims, 9 Drawing Sheets

SINGLE DISC FURROW OPENER WITH WALKING BEAM

This invention claims priority benefit to Canada Patent Application No. 2,615,310, filed Dec. 19, 2007, by BOURGAULT INDUSTRIES LTD., assignee of David Corriveau, Scot Jagow and Cohn Rohel, for "Single Disc Furrow Opener with Walking Beam."

This invention is in the field of agricultural implements and in particular a furrow opener apparatus for depositing seed and fertilizer in the soil.

BACKGROUND

Seeding implements typically comprise a frame adapted for travel over the ground, a plurality of furrow opener assemblies attached to the frame to open one or more furrows, and a distribution system for depositing agricultural materials such as seed and fertilizer into the furrows.

The furrow opener assemblies vary widely in design, but an important object of any design is to maintain the depth of the furrow as constant as possible, such that seed placement is at a constant depth to ensure uniform plant emergence as nearly as possible. The actual furrow opening element will be a hoe or knife type that essentially drags through the soil to form the furrow, or a disc opener comprising a disc which rolls through the soil at an angle to the travel direction to form the furrow.

Disc assemblies may be double disc openers with two discs oriented at an angle such that the discs converge and meet at a lower forward point of the discs to cut the suil at that point, and then diverge rearward of the contact point to form the furrow. A tube is located to drop seed and fertilizer between the discs and into the furrow.

Disc assemblies may also be single disc openers where a single disc engages the soil at an angle to the travel direction, such that a leading face of the disc pushes soil toward one side, such that seed and fertilizer can be deposited into the furrow by a tube adjacent to the trailing face of the disc.

Depth control on disc openers can be accomplished by providing a gauge wheel adjacent to the leading face of the disc. For example, U.S. Pat. No. 4,331,205 to Sorenson et al. discloses a double disc opener with a gauge wheel adjacent to each disc. The gauge wheels can be moved closer to the disc where it is desired to clean wet soil from the disc face, or farther away from the disc as desired. U.S. Pat. No. 4,760,806 to Bigbee discloses a single disc opener with a gauge wheel adjacent to the leading face of the disc. In Bigbee the gauge wheel actually rotates in contact with the leading side of the disc to clean the disc.

A downward bias force is exerted on the furrow opener assembly to force the discs down into the ground to a depth where the gauge wheel contacts the ground and prevents the disc from going any deeper. Such a gauge wheel provides very accurate depth control, since the gauge wheel rolls very close to the disc. Such gauge wheels also have disadvantages in some conditions.

With the gauge wheel close to the disc, the disc is very sensitive to lumps of soil or crop residue in the field. When the gauge wheel rolls up and over an obstruction, the disc also moves up an equal distance, causing uneven seeding depth in conditions of heavy trash or uneven field conditions.

Soil conditions vary across a field and it is necessary to provide sufficient downward force to penetrate harder field areas. In field areas where the soil is soft, especially with a single disc opener this downward force on the gauge wheel can force the gauge wheel down into softer soils, making a furrow that is too deep. High downward forces on the gauge wheel can also lead to over compaction on the sidewall of the furrow in some conditions, and also pulverization of vulnerable soil leading to increased erosion. Soil moved by the disc to form the furrow can pile up in front of the gauge wheel and cause the gauge wheel to stop rotating and bulldoze the soil when excessive downward force on the gauge wheel prevents the gauge wheel from rolling up over this soil.

Each opener type has advantages and disadvantages. For example single disc openers are preferred where the soil is firm, such as in no-till seeding operations where the soil is not cultivated prior to seeding. Single disc openers penetrate the soil better, generally disturb the soil less, and also are less prone to "hair pinning," a condition where straw and trash left on the soil surface are pushed down into the furrow. Double disc openers are preferred for softer soils, such as where the soil is cultivated prior to seeding.

Where the furrow is a seed furrow, once seed is deposited in the furrow it is generally desired to move soil back over the furrow and pack the soil on the furrow. Depending on the particular furrow opener assembly, soil may simply fall back into the furrow or a furrow closing means may be provided. Typically a packer wheel then rolls along the furrow to pack the soil.

In a common furrow opener assembly configured to maintain consistent seed depth, the front end of a trailing arm is pivotally attached to the seeder frame such that the arm extends generally rearward and downward from the frame and can pivot up and down with respect to the seeder frame. A packer wheel is then rotatably attached to support the rear end of the trailing arm. A furrow opener is attached to the trailing arm ahead of the packer wheel such that the vertical position of the bottom of the furrow opener with respect to the bottom of the packer wheel can be fixed at a desired location to substantially set the depth of the furrow. A bias element is provided to force the trailing arm downward to push the furrow opener into the soil and force the packer wheel again it the ground.

The packer wheel pushes down the soil over the seed in the furrow and the bottom of the packer wheel corresponds to the soil surface. The depth of the furrow is substantially determined by the vertical distance that the bottom end of the furrow opener extends below the bottom of the packer wheel. Such a trailing arm furrow opener assembly is disclosed for example in U.S. Pat. No. 7,159,523 to Bourgault et al., particularly in FIG. 1 thereof. U.S. Pat. No. 5,396,851 to Beaujot and U.S. Pat. No. 5,609,114 to Barton disclose trailing arm furrow opener assemblies that operate in a similar way.

A problem occurs with trailing arm furrow opener assemblies such as that of Bourgault, Barton, and Beaujot in uneven terrain where the distance between the frame and the ground varies. As the vertical distance of the frame above the ground varies the trailing arm moves up and down about its pivotal attachment to the frame and the angle of the trailing arm changes such that the distance from the middle portion of the arm, where the furrow opener is attached, to the ground varies, and thus the actual depth of the seed furrow varies.

To improve the consistency of the furrow depth Bourgault et al. also disclose, in FIGS. 5-9 of U.S. Pat. No. 7,159,523, a trailing arm formed by upper and lower parallel arms connected at each end by front and rear links. Such a parallel link assembly has the property that the rear link is maintained in a constant horizontal and vertical orientation through the vertical range of motion without tilting forward or rearward. The front link thereof is fixed to the implement frame and the rear packer wheel and the furrow opener are fixed to the rear link. Thus as the packer wheel moves up and down relative to the frame in uneven terrain, the packer wheel and furrow opener move together vertically and so the furrow depth is maintained at a constant depth. Such a parallel arm however is very sensitive again to lumps of soil or crop residue in the field. Like the gauge wheel closely adjacent to the furrow opening disc described above, when the packer wheel in FIG. 5 of Bourgault moves up over a lump, the furrow opening element moves up the same amount causing uneven seed depth in lumpy field conditions.

U.S. Pat. No. 7,191,715 to Wendte et al. discloses a planting unit attached to a frame with a parallel link mechanism. The unit includes hoppers for carrying seed and fertilizer and a metering system to deliver this material to the furrow. Wendt discloses a double disc furrow opener assembly with a gauge wheel beside each disc and with a walking beam arrangement to reduce the sensitivity of the apparatus to lumps on the field. Each gauge wheel is mounted to the front end of a walking beam beside the discs, and a packer wheel is mounted to the rear end of each walking beam. Closer discs move soil back over the furrow in front of the packer wheels. The unit is supported on the walking beam at the mid-point of the walking beam. Thus when either the front gauge wheel or rear packer wheel rolls over a lump and moves up by the height of the lump, the mid point of the beam only moves up only one half of the height of the lump. Wendte also discloses that a swivel can be provided between the right and left rear packer wheels to further reduce movement of the furrow opening discs when the rear packer wheel rolls over a lump.

Similar walking beam planter units are disclosed in U.S. Pat. No. 5,351,635 to Hulicsko and U.S. Pat. No. 5,461,993 to Ikumoto et al. Also U.S. Pat. No. 4,750,441 to Pfenninger and U.S. Pat. No. 4,846,084 to Sigle disclose a furrow opener supported at the mid-point of a walking beam. The beam has wheels at its front and rear ends and the furrow opener is located between the front and rear wheels.

SUMMARY OF THE INVENTION

It is an object of the present invention to provide a furrow opener apparatus that overcomes problems in the prior art.

The present invention provides a furrow opener apparatus comprising an arm assembly adapted at a front end thereof for pivotal attachment to a seeder frame such that a rear end of the arm assembly can move up and down. A single disc is rotatably attached to the arm assembly about a disc axis oriented at a horizontal disc angle to the operating travel direction such that a leading face of the disc moves soil toward a first side of the disc when the disc is engaged in the ground to form a furrow. A walking beam is pivotally attached to the arm assembly rearward of the disc about a beam axis oriented transverse to the operating travel direction. A bias element is operative to exert a force on the arm assembly such that a downward bias force is exerted on the walking beam at the beam axis. A packer wheel is rotatably attached at a rear end of the walking beam about a packer wheel axis, rearward of the beam axis, and a gauge wheel is rotatably attached at a front end of the walking beam about a gauge wheel axis, forward of the beam axis. The gauge wheel is configured to roll along the ground adjacent to the leading face of the disc, and the packer wheel is configured to roll along the furrow.

The apparatus of the invention thus provides a furrow opener assembly with a single disc mounted on a downwardly biased trailing arm that is supported at a rear end thereof by a walking beam. A forward end of the walking beam is supported by a gauge wheel adjacent to the leading face of the disc. The gauge wheel can also act as a cleaning wheel to remove mud and the like that might stick to the leading face of the disc. The rear end of the walking beam is supported by a packer wheel.

The rear end of the trailing arm is pivotally connected to the walking beam at a beam pivot axis that can be located nearer to the packer wheel than to the gauge wheel, such that proportionally more of the downward force on the rear end of the trailing arm is supported by the packer wheel compared to the gauge wheel. Downward force is thus increased on the packer wheel, and reduced on the gauge wheel, compared to a configuration where the beam axis is midway between the packer and gauge wheels. It is contemplated that about 60-70% of the force on the walking beam will be supported by the packer wheel. Downward force on the gauge wheel is thus reduced, and problems of soil pulverization, compaction, bulldozing, and the like are reduced. Increased force on the packer wheel provides required packing force.

The furrow opening disc moves vertically as the beam axis moves up and down. This up and down movement of the beam axis is reduced compared to the up and down movement of either the gauge wheel or packer wheel, thereby reducing variations in seeding depth. To improve performance in some soil conditions such as lighter soils sensitive to pulverization, pivotal movement of the walking beam can be limited so that the packer wheel is down and the gauge wheel is up off the soil so that all force is on the packer wheel.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
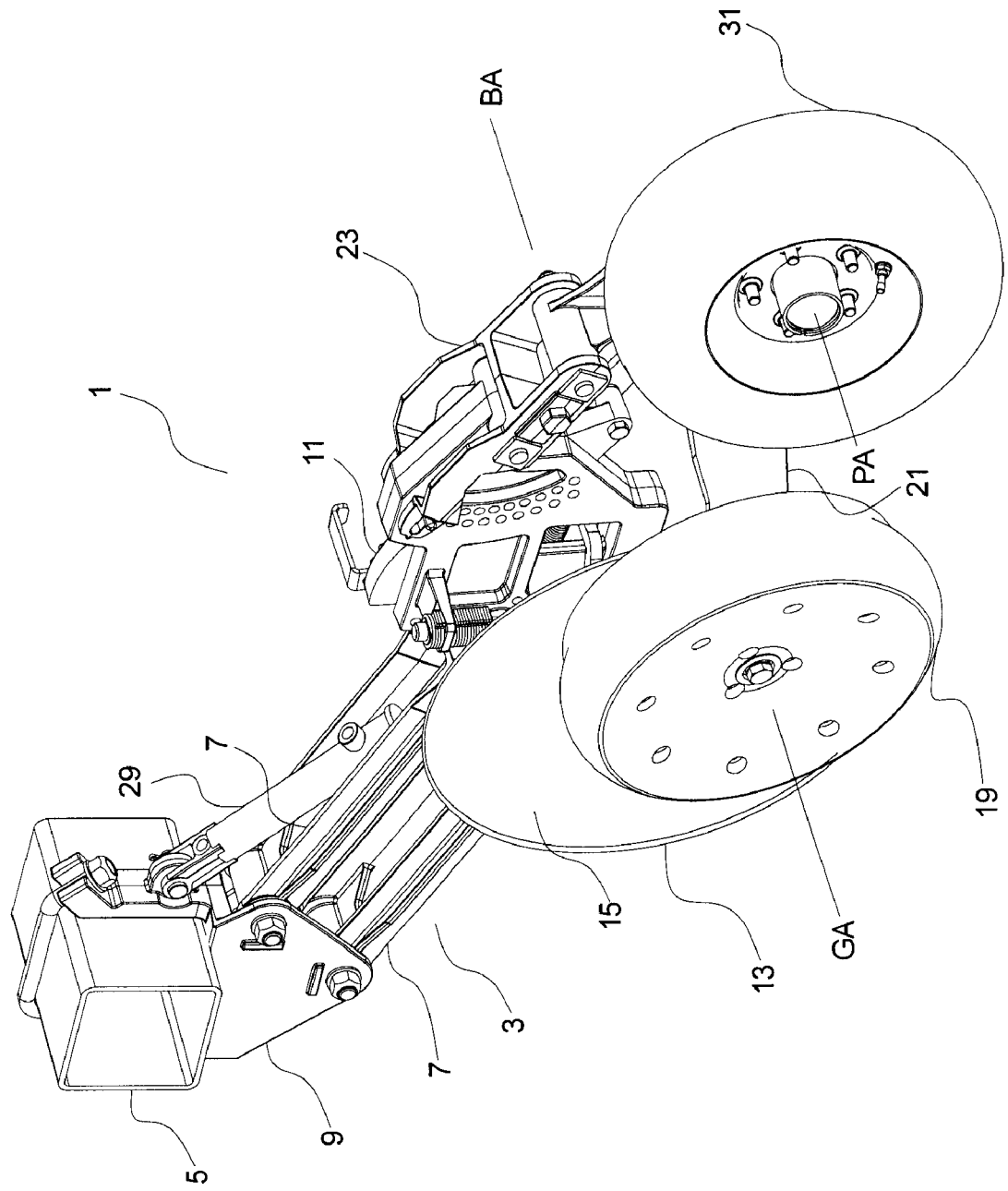
FIG. 1 is a perspective rear view of an embodiment of the furrow opener apparatus of the invention.

FIGS. 1-8 illustrate an embodiment of a furrow opener apparatus 1 of the present invention. The apparatus 1 comprises an arm assembly 3 adapted at a front end thereof for pivotal attachment to a seeder frame 5 such that a rear end of the arm assembly 3 can move up and down. Although it could also comprise just a single arm, the arm assembly 3 in the illustrated apparatus 1 comprises upper and lower parallel arm members 7 pivotally attached at forward ends thereof to a front link 9 that is adapted for attachment to the seeder frame 5. The parallel arm members 7 are pivotally attached at rearward ends thereof to a rear link 11 such that the upper and lower arm members 7 are maintained parallel to each other, and such that the front and rear links 9, 11 are maintained in a substantially constant fore and aft orientation as the arm members 7 move up and down. Thus when the front link 9 is attached to the frame S, the rear link 11 is maintained in substantially constant fore and aft orientation relative to the frame 5.

Figure 5:
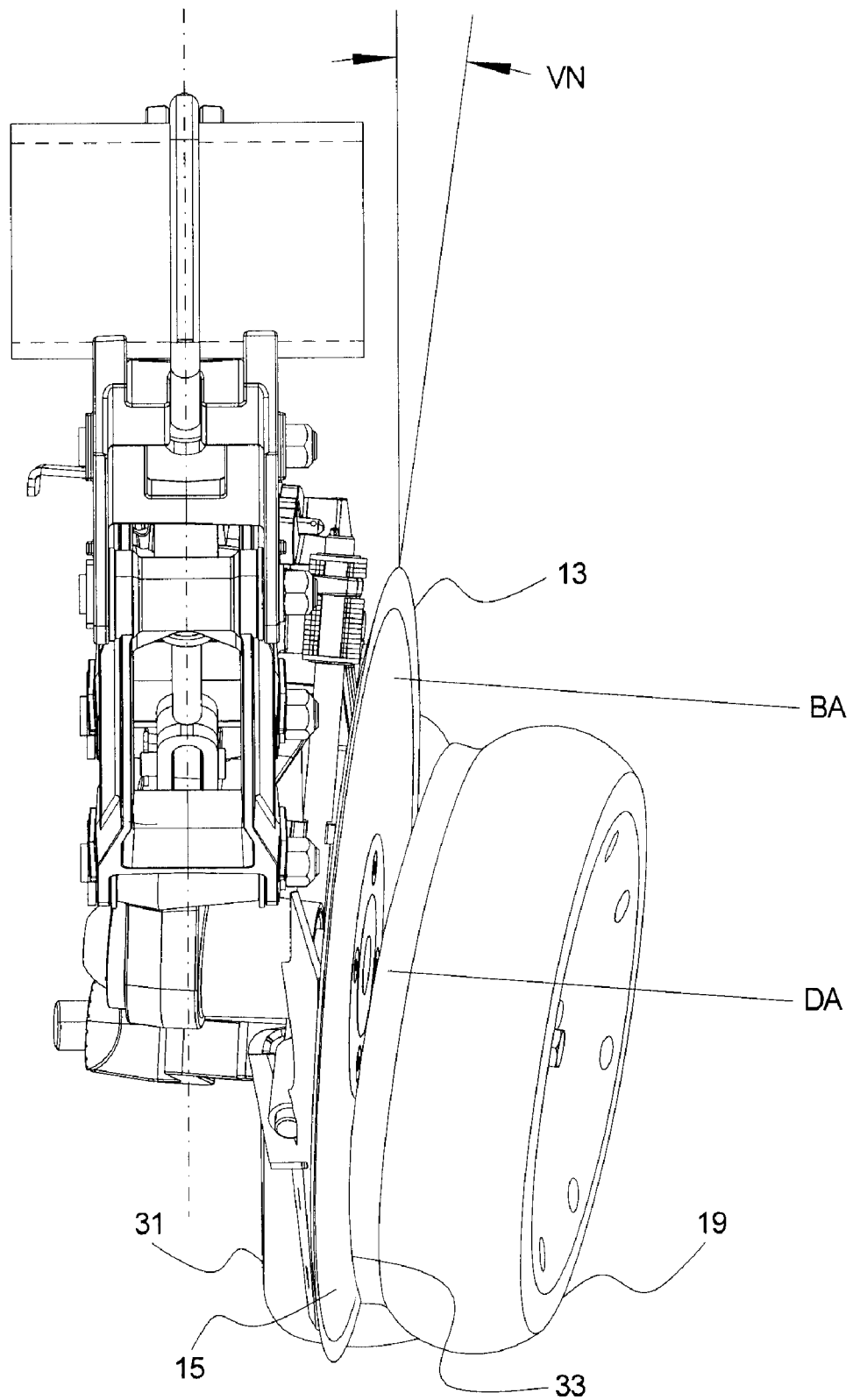
FIG. 5 is a front view of the embodiment of FIG. 1.

A single disc 13 is rotatably attached to the arm assembly 3 about a disc axis DA. In the illustrated apparatus 1, the disc 13 is flat and is rotatably attached to the rear link 11. The disc 13 is oriented at a horizontal disc angle HN to the operating travel direction T such that a leading face 15 of the disc 13 moves soil toward a first side of the disc 13 when the disc 13 is engaged in the ground to form a furrow. In the illustrated apparatus 1 as seen in FIG. 5, the disc 13 is also oriented at a downward vertical disc angle VN such that the leading face 15 of the disc 13 is generally below a trailing face 17 of the disc 13. Soil moved by the disc 13 when forming a furrow is thus pushed somewhat downward, such that the moved soil interferes less with the gauge wheel 19 rolling along the soil surface adjacent to the disc 13.

A walking beam 21 is pivotally attached to the arm assembly 3 rearward of the disc 13 about a beam axis BA oriented transverse to the operating travel direction T. In the illustrated apparatus 1 the rear link 11 comprises a rear arm 23 extending rearward from a forward portion of the rear link 11, and the walking beam 21 is pivotally attached to the rear end of the rear arm 23, such that the beam axis BA is defined in the rear end of the rear arm 23. The rear arm 23 is pivotally attached at arm axis AA to the rearward portion of the rear link 11, and is locked with respect to the rear link 11 by inserting a pin 25 through the rear one of the depth adjusting holes 27 in the forward portion of the rear link 11. This arrangement provides an adjustment mechanism operative to adjust the vertical distance between the beam axis BA and the disc axis DA to adjust a depth of the furrow.

A bias element, illustrated as an extendable hydraulic cylinder 29, is operative to exert a force on the arm assembly 3 such that a downward bias force BF is exerted on the walking beam 21 at the beam axis BA.

A packer wheel 31 is rotatably attached at a rear end of the walking beam 21 about a packer wheel axis PA, rearward of the beam axis BA, and the gauge wheel 19 is rotatably attached at a front end of the walking beam 21 about a gauge wheel axis GA, forward of the beam axis BA. The gauge wheel 19 is configured to roll along the ground adjacent to the leading face 15 of the disc 13, and the packer wheel 31 is configured to roll along the furrow created by the disc 13.

The gauge wheel 19 in the illustrated apparatus 1 is oriented at an angle to the leading face 15 of the disc 13, and an inner edge 33 of the gauge wheel 19 touches the leading face 15 of the disc 13. The inner edge 33 is configured to clean the leading face 15 of the disc 13 as the edge 33 and face 15 rub against each other. As the apparatus 1 travels along the ground surface in a field, the gauge wheel 19 will move up and down with respect to the disc 13. In order to maintain the proper orientation of the gauge wheel 19 and disc 13 to maintain the wheel edge 33 in contact with the disc leading face 15 during this relative movement, the apparatus 1 is configured such that the beam axis BA is substantially parallel to the disc axis DA.

Figure 9:
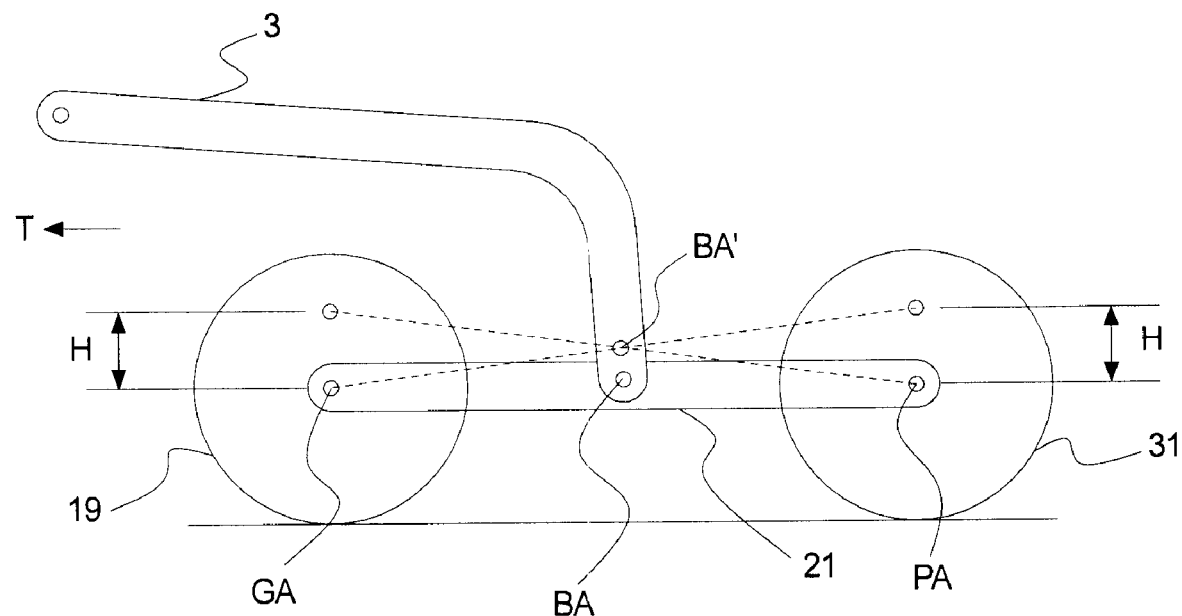
FIG. 9 is a schematic side view of configuration or the present apparatus where the beam axis is located equidistant from the gauge wheel axis and the packer wheel axis.

The walking beam 21 reduces the vertical movement of the disc 13 when either the packer wheel or gauge wheel roll over an obstacle or into a hole, and thus reduces variations in the depth of the furrow made by the disc 13. With the beam axis BA located midway between the gauge wheel axis GA and the packer wheel axis PA, as schematically illustrated in FIG. 9, upward movement of the front gauge wheel 19 and gauge wheel axis GA by a distance H, relative to the packer wheel axis PA, will move the beam axis BA upward to a position indicated by BA, which is an upward movement of 0.5H. Similarly upward movement of the rear packer wheel 31 and packer wheel axis PA by the same distance H will move the beam axis BA upward to the same position indicated by BA, again an upward movement of 0.5H. The downward bias force BF exerted on the walking beam 21 at the beam axis BA is distributed equally between the gauge wheel 19 and the packer wheel 31.

Figure 2:
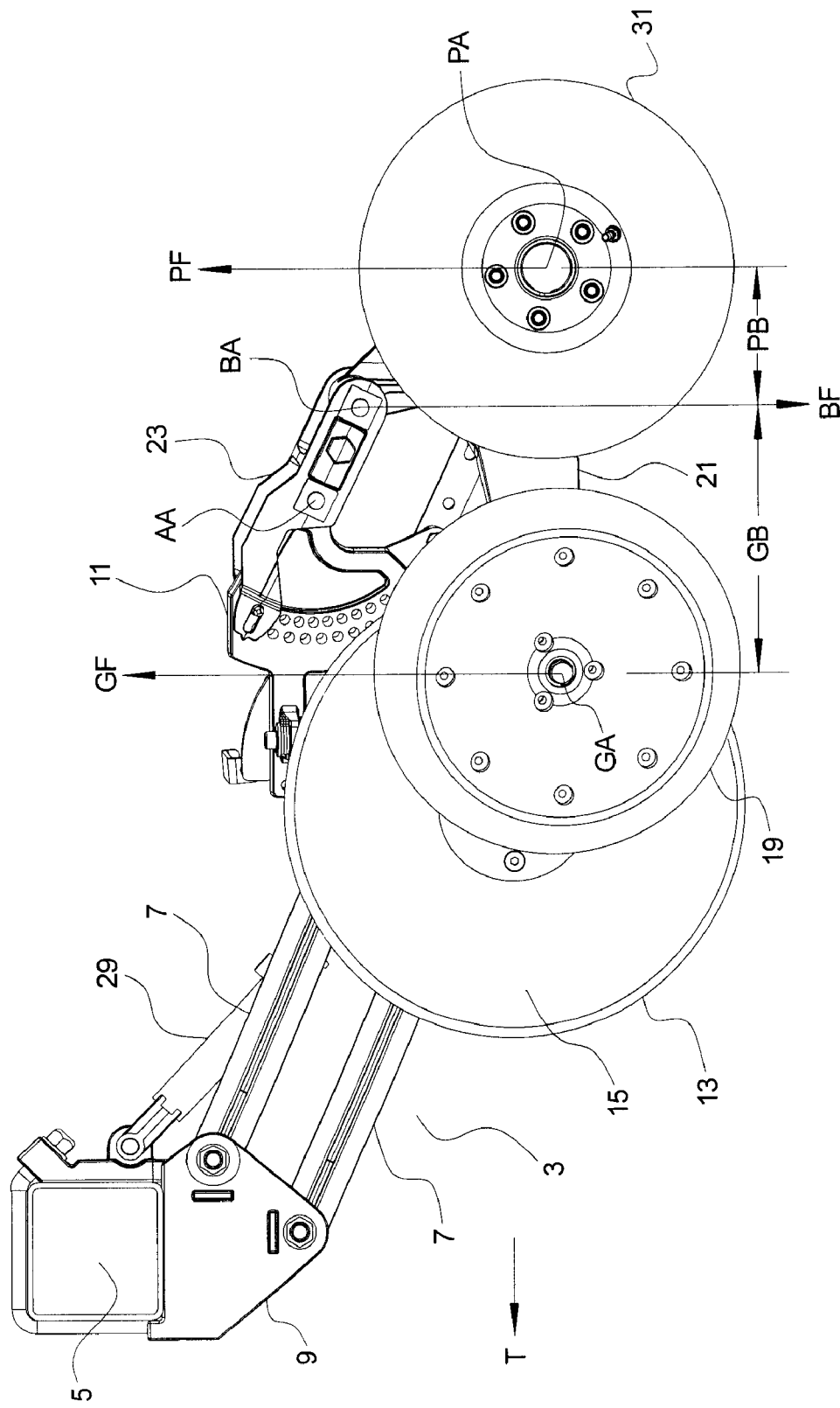
FIG. 2 is a left side view of the embodiment of FIG. 1.
Figure 3:
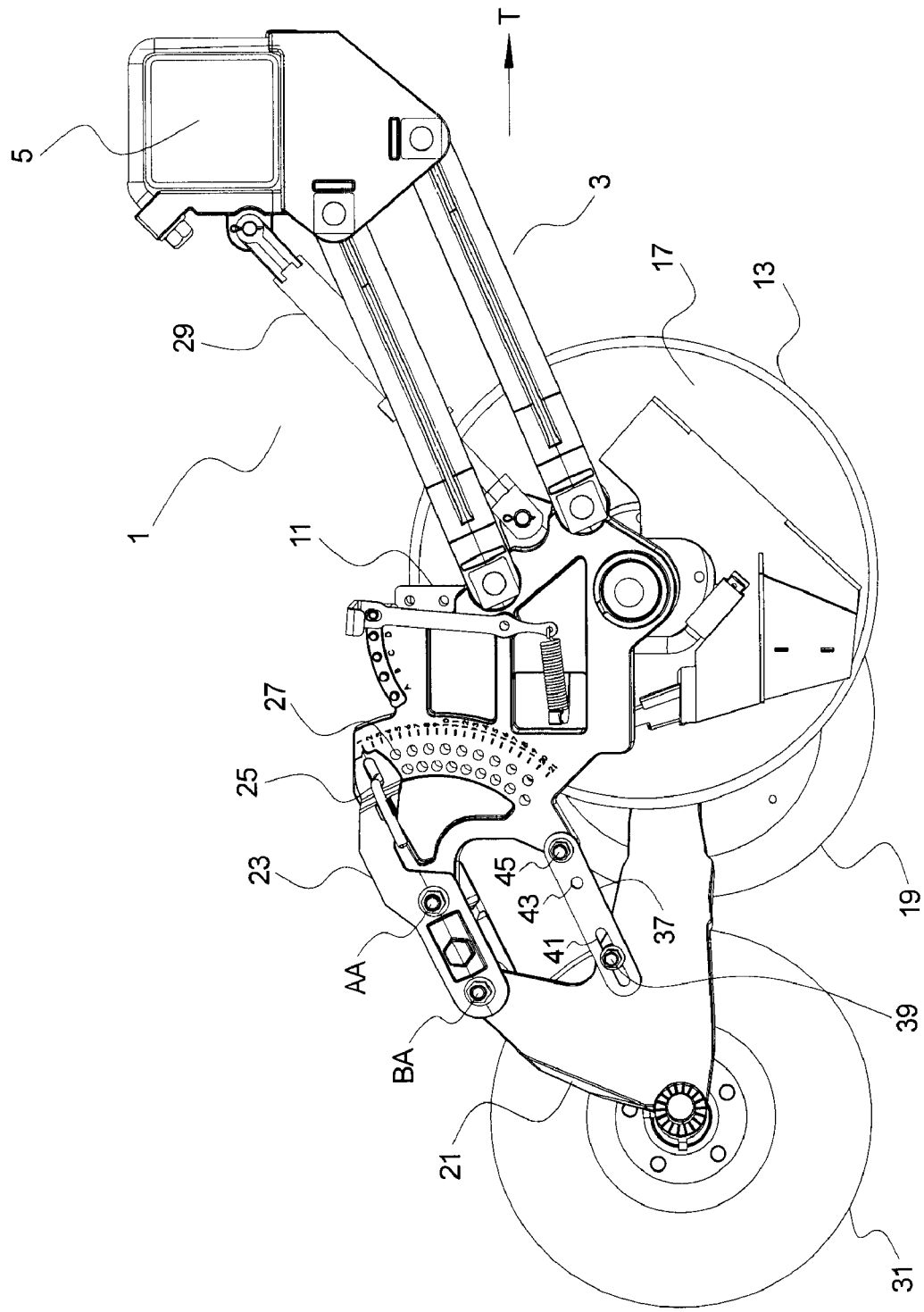
FIG. 3 is a right side view of the embodiment of FIG. 1.
Figure 4:
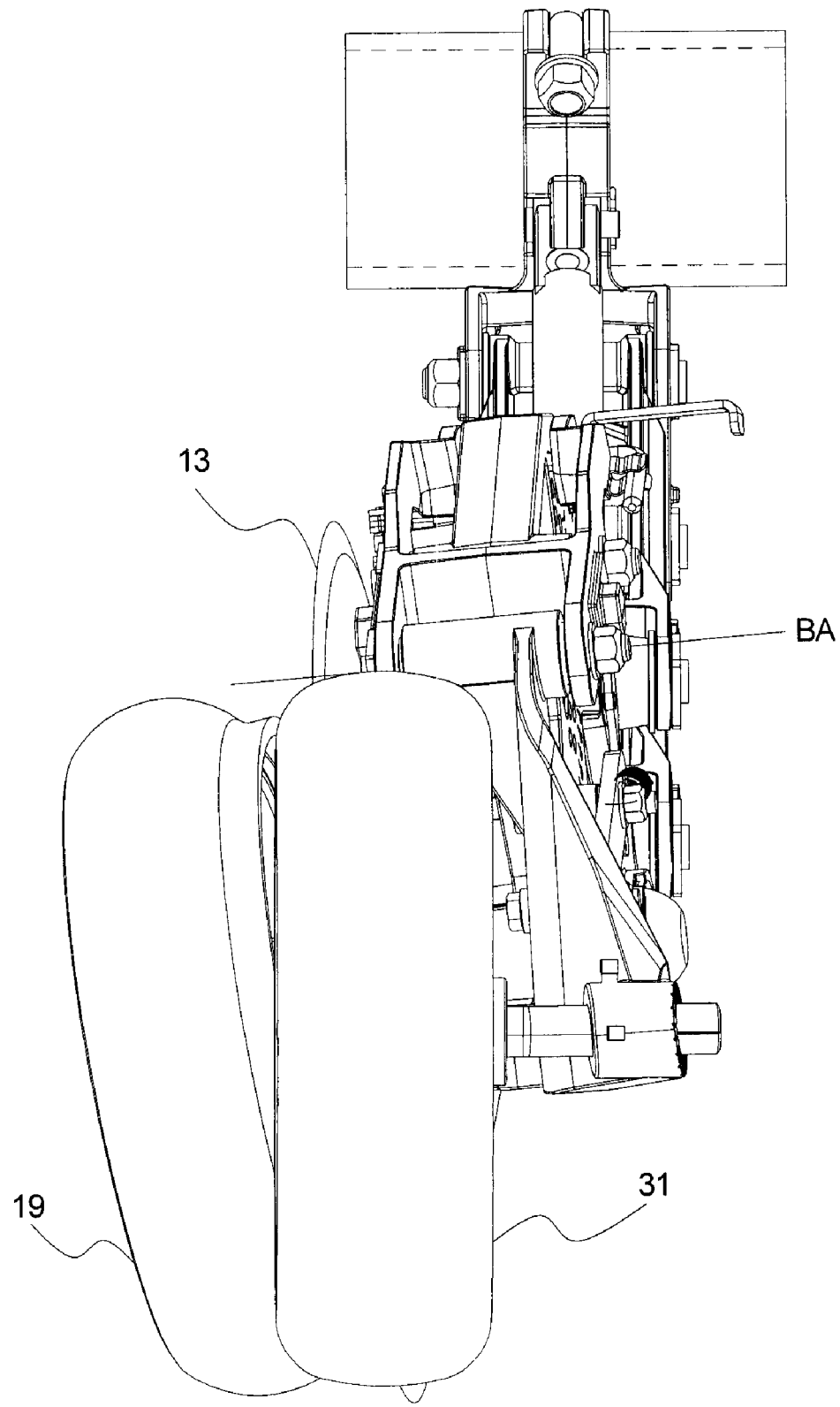
FIG. 4 is a rear view of the embodiment of FIG. 1.
Figure 10:
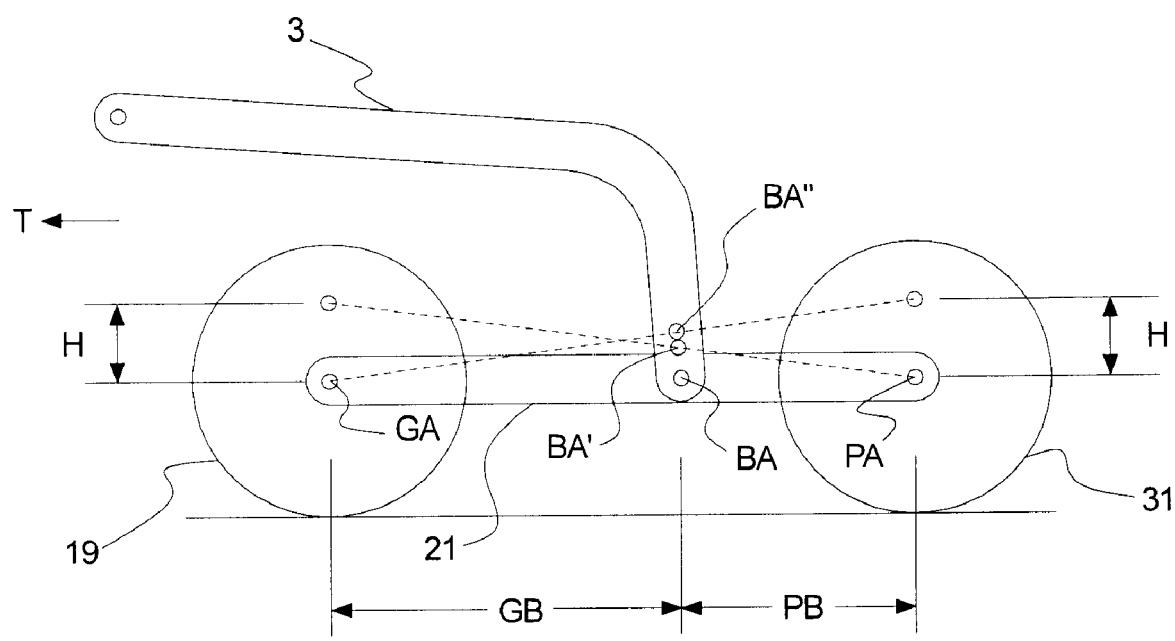
FIG. 10 is a schematic side view of configuration of the apparatus of FIGS. 1-8 where the beam axis is located closer to the packer wheel axis and farther from the gauge wheel axis.

The illustrated apparatus 1 however is shown in an offset configuration where the distance PB from the packer wheel axis PA to the beam axis BA is less than the distance GB from the gauge wheel axis GA to the beam axis BA, as illustrated in FIG. 2, and also as schematically illustrated in FIG. 10. In the illustrated apparatus 1, and as schematically illustrated in FIG. 10, the distance GB from the gauge wheel axis GA to the beam axis BA is substantially greater than the distance PB from the packer wheel axis PA to the beam axis BA.

With the downward bias force BF exerted on the walking beam 21 at the beam axis, this configuration causes the downward bias force BF to be distributed unequally between the gauge wheel 19 and the packer wheel 31, such that the force PF exerted on the ground by the packer wheel 31 is twice the force GF exerted on the ground by the gauge wheel 19.

Reducing the gauge wheel force can have benefits, because excessive gauge wheel force GF can cause problems in operation. In field areas where the soil is soft, excessive force on the gauge wheel 19 can force the gauge wheel 19 down into the soil, making a furrow that is too deep. Such forces can also lead to over compaction on the sidewall of the furrow in some conditions, and also pulverization of vulnerable soil leading to increased erosion. Soil moved by the disc 13 to form the furrow can pile up in front of the gauge wheel 19 and cause the gauge wheel 19 to stop rotating and bulldoze the soil.

At the same time it is most commonly desirable to have considerable force exerted to pack the furrow. Thus increasing the packer wheel force PF while reducing the gauge wheel force GF is desirable in common conditions. In the configuration of FIG. 10 the proportion of the downward bias force BF exerted on the packer wheel 31, equal to the packing force PF, is 66.67%. It is contemplated that the packing force PF will most beneficially fall between 60% and 70% of the downward bias force BF.

This offset configuration also has the effect of making the furrow depth more sensitive to vertical movement of the trailing packer wheel 31 than it is to vertical movement of the leading gauge wheel 19, as schematically illustrated in FIG. 10.

With this configuration, upward movement of the front gauge wheel 19 and gauge wheel axis GA by a distance H, relative to the packer wheel axis PA, will move the beam axis BA upward to a position indicated by BA, while upward movement of the rear packer wheel 31 and packer wheel axis PA by the same distance H will move the beam axis BA upward farther to a position indicated by BA. It is contemplated that up and down movement of the leading gauge wheel 19 moving in direction T will be more pronounced than that of the following packer wheel 31. The gauge wheel will encounter any soil lumps or the like that are in the field before the packer wheel 31 docs. While the gauge wheel 19, disc 13, and packer wheel 31 are not exactly aligned, many soil lumps will be at least partially crushed and stones and the like at least partially pushed aside or pushed down into the soil by the gauge wheel 19 and the disc 13 before the packer wheel 31 encounters them. Thus it is contemplated that while providing the offset configuration to place more of the downward bias force BF on the packer wheel, it also makes the furrow more sensitive to the vertical movement of the packer wheel 31, furrow depth will not be adversely affected.

Figure 7:
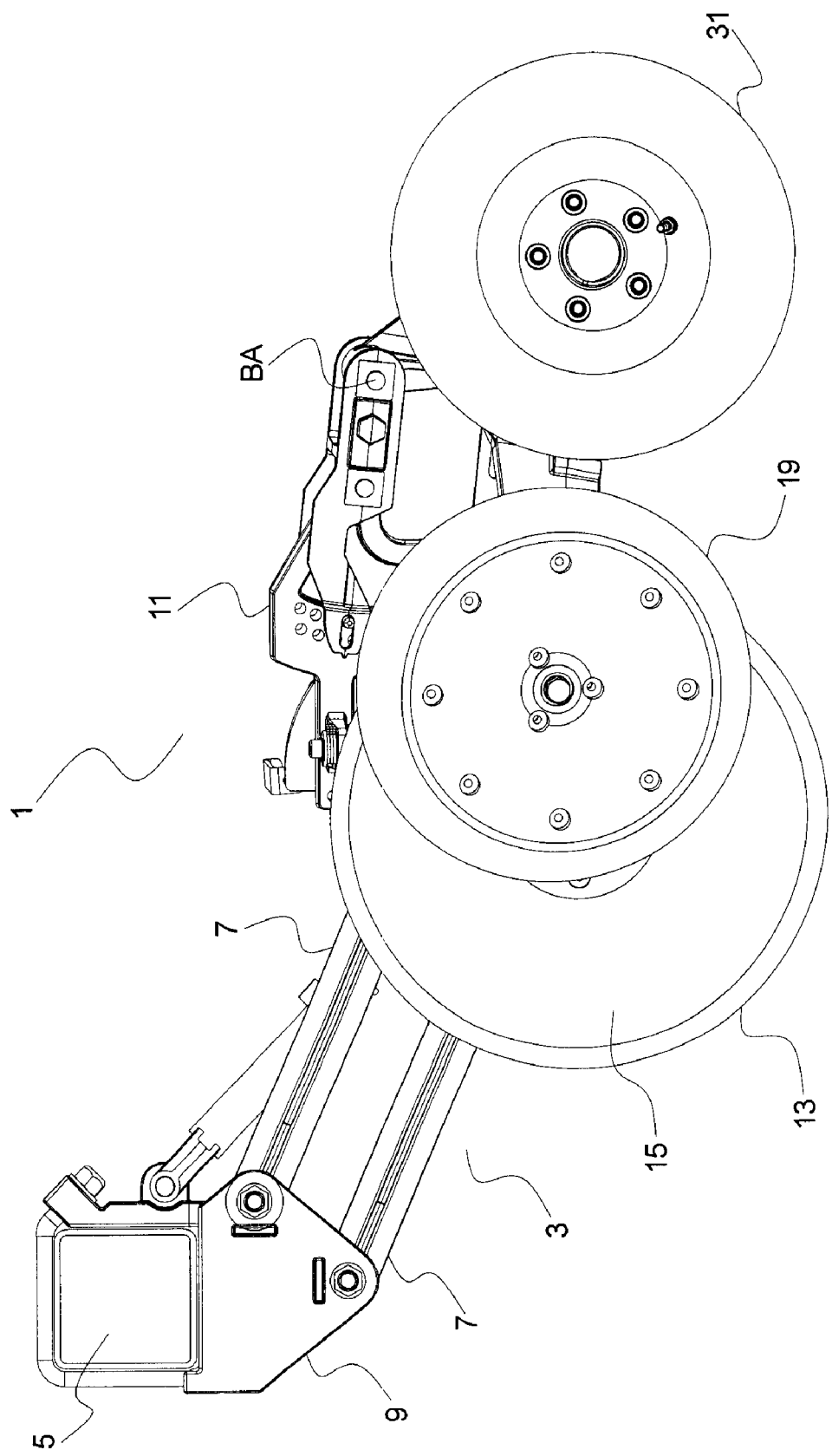
FIG. 7 is a left side view of the embodiment of FIG. 1 with the gauge wheel locked up.
Figure 8:
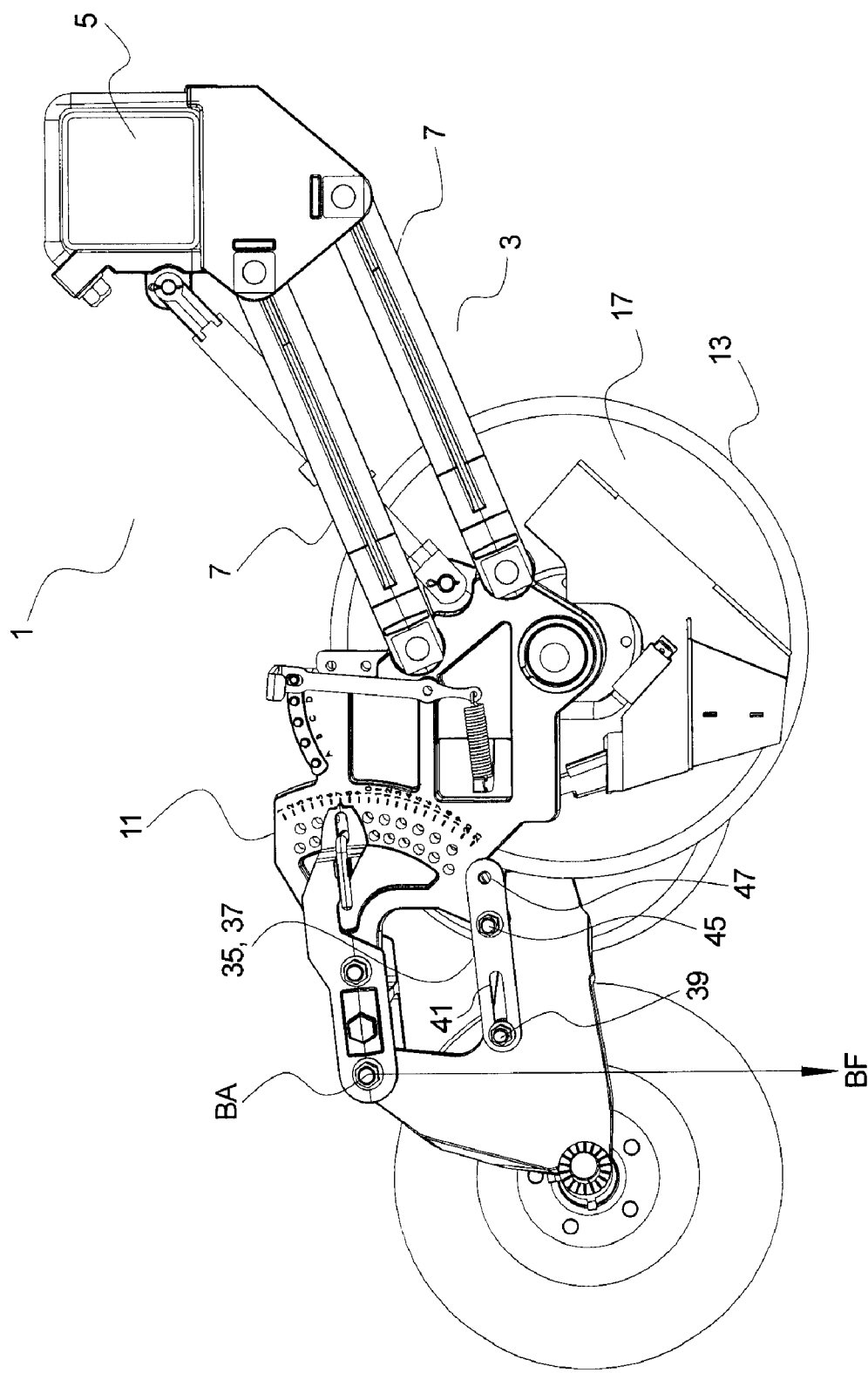
FIG. 8 is a right side view of the embodiment of FIG. 1 with the gauge wheel locked up as in FIG. 1.

The illustrated apparatus 1 also shows a limiting mechanism 35 operative to selectively limit pivotal movement of the walking beam 21 with respect to the arm assembly 3. As illustrated in FIGS. 7 and 8 the limiting mechanism 35 operates to keep the gauge wheel 19 raised such that substantially all the downward bias force BF is exerted on the packer wheel 31. In the illustrated apparatus the limiting mechanism 35 is provided by a rigid link 37 connectable between the arm assembly 3 and the walking beam 21. In the illustrated limiting mechanism 35, the rigid link 37 is pivotally connected to the rear link 11 of the arm assembly 3 by a pin or bolt 45 through hole 47, and is connected to the walking beam 21 by a bolt 39 through a slot 41 in the rigid link 37. The bolts 39 and 45 are loose such that the walking beam 21 is free to pivot about the beam axis BA through a limited range of travel defined by the length of the slot 41. The gauge wheel 19 can be locked in a raised position by removing the bolt 45 from the hole 47 and inserting it in the hole 43 (see FIG. 3) in the link. In this configuration the front gauge wheel 19 is in a raised position relative to the rear packer wheel 31. A downward force BF on the beam axis BA biases the bolt 39 towards the end of the slot 41 such that substantially all the downward force BF is exerted on the packer wheel 31, as illustrated in the position of FIG. 8.

The slot 41 in the rigid link 37 allows the walking beam 21 to pivot about the beam axis BA, but limits the range of pivoting travel of the walking beam 21 to a contemplated maximum required pivoting motion for normal operating circumstances, such that the risk that in some circumstance the beam 21 might pivot to a point where the parts of the mechanism move out of their desired respective position is avoided.

Figure 6:
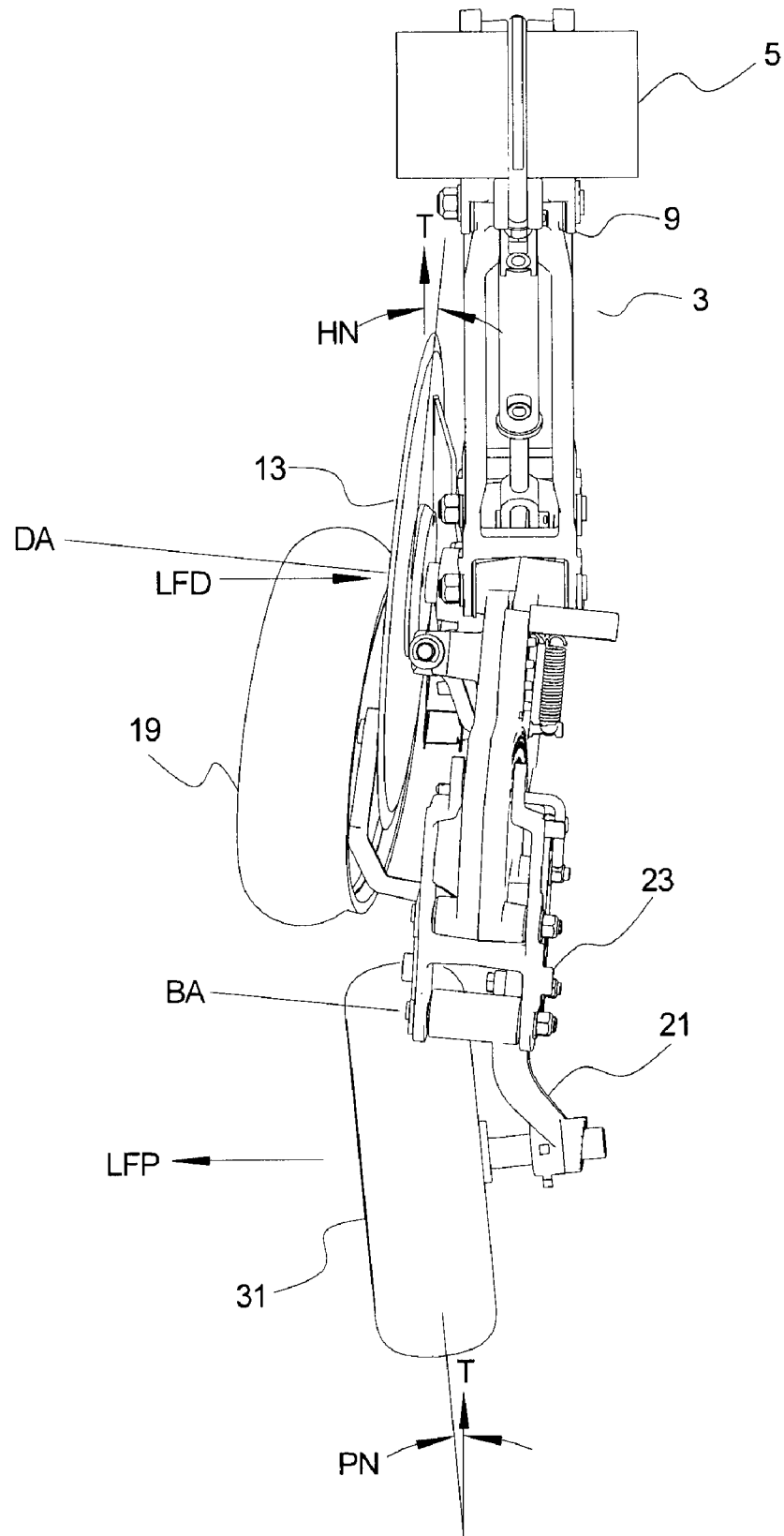
FIG. 6 is a top view of the embodiment of FIG. 1.

The illustrated apparatus 1 also shows the packer wheel 31 oriented such that, as seen in FIG. 6, the packer wheel 31 rotates at a packer angle PN to the operating travel direction T that is opposite to the horizontal disc angle HN such that when rolling along the ground the packer wheel 31 exerts a lateral force LFP on the arm assembly that is opposite to a lateral force LFD exerted by soil on the leading face 15 of the disc 13.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A furrow opener apparatus comprising:
   an arm assembly adapted at a front end thereof for pivotal attachment to a seeder frame such that a rear end of the arm assembly can move up and down;
   a single disc rotatably attached to the arm assembly about a disc axis oriented at a horizontal disc angle to the operating travel direction such that a leading face of the disc moves soil toward a first side of the disc when the disc is engaged in the ground to form a furrow;
   a walking beam pivotally attached to the arm assembly rearward of the disc about a beam axis oriented transverse to the operating travel direction such that the beam axis and disc axis are fixed with respect to each other during operation;
   a bias element operative to exert a force on the arm assembly such that a downward bias force is exerted on the walking beam at the beam axis;
   a packer wheel rotatably attached at a rear end of the walking beam about a packer wheel axis, rearward of the beam axis;
   a gauge wheel rotatably attached at a front end of the walking beam about a gauge wheel axis, forward of the beam axis;
   wherein the gauge wheel is configured to roll along the ground adjacent to the leading face of the disc, and the packer wheel is configured to roll along the furrow.

2. The apparatus of claim 1 wherein the gauge wheel is oriented at an angle to the leading face of the disc, and wherein an edge of the gauge wheel touches the leading face of the disc and is configured to clean the leading face of the disc, and wherein the beam axis is substantially parallel to the disc axis.

3. The apparatus of claim 1 wherein a distance from the packer wheel axis to the beam axis is less than a distance from the gauge wheel axis to the beam axis such that a greater proportion of the downward bias force is exerted on the packer wheel than is exerted on the gauge wheel.

4. The apparatus of claim 3 wherein the proportion of the downward bias force exerted on the packer wheel is between 60% and 70% of the downward bias force.

5. The apparatus of claim 1 further comprising an adjustment mechanism operative to adjust a vertical distance between the beam axis and the disc axis to adjust a depth of the furrow.

6. The apparatus of claim 1 wherein a range of pivoting travel of the walking beam about the beam axis is limited.

7. The apparatus of claim 1 comprising a limiting mechanism operative to selectively limit the range of pivoting travel of the walking beam with respect to the arm assembly such that the gauge wheel is in a raised position such that substantially all the downward bias force is exerted on the packer wheel.

8. The apparatus of claim 7 wherein the limiting mechanism comprises a rigid link connectable between the arm assembly and the walking beam.

9. The apparatus of claim 7 wherein the limiting mechanism is operative to selectively restrict a range of pivoting travel of the walking beam.

10. The apparatus of claim 1 wherein the arm assembly comprises upper and lower parallel arm members pivotally attached at forward ends thereof to a front link adapted for attachment to the seeder frame, and pivotally attached at rearward ends thereof to a rear link such that the upper and lower arm members are maintained parallel to each other, and such that the front and rear links are maintained in a substantially constant fore and aft orientation as the arm members move up and down.

11. The apparatus of claim 10 wherein the disc is rotatably attached to the rear link, and wherein the beam axis is defined by a portion of the rear link rearward of the disc axis.

12. The apparatus of claim 11 wherein the rear link comprises a rear arm extending rearward from a forward portion of the rear link, and wherein the beam axis is defined in a rear end of the rear arm.

13. The apparatus of claim 1 wherein the disc is oriented at a downward vertical disc angle such that the leading face of the disc is below a trailing face of the disc.

14. The apparatus of claim 1 wherein the gauge wheel is oriented at an angle to the leading face of the disc and with an edge thereof touching the leading face of the disc, and wherein the edge of the gauge wheel is configured to clean the leading face of the disc.

15. The apparatus of claim 1 wherein the packer wheel is oriented such that the packer wheel rotates at a packer angle to the operating travel direction that is opposite to the disc angle such that the packer wheel exerts a lateral force on the arm assembly that is opposite to a lateral force exerted by soil on the leading face of the disc.

* * * * *